(12) United States Patent
Dodson et al.

(10) Patent No.: US 11,740,465 B2
(45) Date of Patent: Aug. 29, 2023

(54) OPTICAL SYSTEMS WITH AUTHENTICATION AND PRIVACY CAPABILITIES

(71) Applicant: Apple Inc., Cupertino, CA (US)

(72) Inventors: Christopher M. Dodson, Denver, CO (US); Jonathan B. Pfeiffer, Lafayette, CO (US)

(73) Assignee: Apple Inc., Cupertino, CA (US)

(*) Notice: Subject to any disclaimer, the term of this patent is extended or adjusted under 35 U.S.C. 154(b) by 48 days.

(21) Appl. No.: 17/171,864

(22) Filed: Feb. 9, 2021

(65) Prior Publication Data

US 2021/0303851 A1 Sep. 30, 2021

Related U.S. Application Data

(60) Provisional application No. 63/000,650, filed on Mar. 27, 2020.

(51) Int. Cl.
*G06V 20/00* (2022.01)
*G02B 27/01* (2006.01)
(Continued)

(52) U.S. Cl.
CPC ........ *G02B 27/0172* (2013.01); *G02B 6/0036* (2013.01); *G03H 1/0248* (2013.01);
(Continued)

(58) Field of Classification Search
CPC ...... G06V 20/10; G06V 10/143; G06V 20/20; G06V 40/172; G02B 6/0036; G02B 27/0172; G02B 2027/0138; G02B 2027/014; G02B 2027/0174; G03H 1/0248; G03H 2001/2615; G03H 2001/266; H04N 5/33
See application file for complete search history.

(56) References Cited

U.S. PATENT DOCUMENTS 7,502,168 B2   3/2009 Akutsu et al.
7,884,977 B2 * 2/2011 Mori ............... H04N 19/12
                                                358/538

(Continued)

FOREIGN PATENT DOCUMENTS

KR    20190044838 A   5/2019
WO    2020010271 A1   1/2020

*Primary Examiner* — Frank F Huang
(74) *Attorney, Agent, or Firm* — Treyz Law Group, P.C.; Michael H. Lyons (57) ABSTRACT

A head-mounted electronic device may include a display with an optical combiner. The combiner may include a waveguide with first and second output couplers. The first output coupler may couple a first portion of image light at visible wavelengths out of the waveguide and towards an eye box. The second output coupler may couple a second portion of the image light at near-infrared wavelengths out of the waveguide and towards the surrounding environment. The second portion of the image light may include an authentication code that is used by a secondary device to authenticate the head-mounted device and/or may include a pattern that serves to prevent camera equipment in the surrounding environment from capturing accurate facial recognition information from a user while wearing the head-mounted device.

18 Claims, 7 Drawing Sheets

(51) Int. Cl.
  *G03H 1/02*     (2006.01)
  *H04N 5/33*     (2023.01)
  *F21V 8/00*     (2006.01)
  *G06V 20/10*    (2022.01)
  *G06V 10/143*   (2022.01)
  *G06V 20/20*    (2022.01)
  *G06V 40/16*    (2022.01)

(52) U.S. Cl.
  CPC ............ *G06V 10/143* (2022.01); *G06V 20/10* (2022.01); *G06V 20/20* (2022.01); *G06V 40/172* (2022.01); *H04N 5/33* (2013.01); *G02B 2027/014* (2013.01); *G02B 2027/0138* (2013.01); *G02B 2027/0174* (2013.01)

(56) References Cited

U.S. PATENT DOCUMENTS

| | | | |
|---|---|---|---|
| 8,086,044 B2* | 12/2011 | Feng | H04N 19/176 |
| | | | 382/220 |
| 8,878,773 B1* | 11/2014 | Bozarth | G06T 7/74 |
| | | | 382/103 |
| 9,140,444 B2 | 9/2015 | Connor | |
| 9,274,597 B1* | 3/2016 | Karakotsios | G06F 3/0346 |
| 9,384,383 B2 | 7/2016 | Hudgins | |
| 9,442,292 B1* | 9/2016 | Gao | G02B 27/0093 |
| 9,557,568 B1* | 1/2017 | Ouderkirk | B29D 11/00644 |
| 9,679,194 B2 | 6/2017 | Ra et al. | |
| 10,007,406 B1* | 6/2018 | Libin | G06F 3/0484 |
| 10,217,286 B1* | 2/2019 | Angel | G06F 3/013 |
| 10,389,475 B2 | 8/2019 | Bostick et al. | |
| 10,466,484 B1* | 11/2019 | Yoon | H04N 13/332 |
| 10,466,779 B1* | 11/2019 | Liu | G06T 19/006 |
| 10,502,963 B1* | 12/2019 | Noble | B29D 11/0073 |
| 10,536,273 B2 | 1/2020 | Yildiz et al. | |
| 2008/0143820 A1* | 6/2008 | Peterson | G06T 11/60 |
| | | | 348/E7.001 |
| 2008/0212942 A1* | 9/2008 | Gordon | H04N 21/23424 |
| | | | 348/E7.071 |
| 2009/0196460 A1* | 8/2009 | Jakobs | G06V 40/19 |
| | | | 382/103 |
| 2011/0234750 A1* | 9/2011 | Lai | G03B 37/04 |
| | | | 348/E7.001 |
| 2012/0249957 A1* | 10/2012 | Shibata | A61B 3/0025 |
| | | | 351/206 |
| 2012/0250980 A1* | 10/2012 | Gillard | H04N 5/272 |
| | | | 382/173 |
| 2012/0254369 A1* | 10/2012 | Gillard | H04N 21/4756 |
| | | | 709/219 |
| 2012/0257005 A1* | 10/2012 | Browne | G02B 27/017 |
| | | | 348/E7.001 |
| 2013/0174213 A1 | 7/2013 | Liu et al. | |
| 2013/0182066 A1* | 7/2013 | Ishimoto | E02F 9/261 |
| | | | 348/38 |
| 2014/0037213 A1* | 2/2014 | Niederberger | G06V 20/00 |
| | | | 382/195 |
| 2014/0049452 A1* | 2/2014 | Maltz | G02B 27/017 |
| | | | 345/8 |
| 2014/0140654 A1 | 5/2014 | Brown et al. | |
| 2016/0029883 A1* | 2/2016 | Cox | G06V 40/19 |
| | | | 351/209 |
| 2016/0085300 A1* | 3/2016 | Robbins | H04N 5/232123 |
| | | | 345/633 |
| 2016/0241892 A1* | 8/2016 | Cole | H04N 19/44 |
| 2016/0342205 A1* | 11/2016 | Shigeta | G06V 40/193 |
| 2017/0227764 A1 | 8/2017 | Kim et al. | |
| 2017/0299860 A1* | 10/2017 | Wall | G02B 3/04 |
| 2018/0046859 A1* | 2/2018 | Jarvenpaa | H04N 5/332 |
| 2018/0275409 A1* | 9/2018 | Gao | H04N 13/332 |
| 2018/0307048 A1* | 10/2018 | Alexander | G03H 1/26 |
| 2018/0323972 A1 | 11/2018 | Reed et al. | |
| 2019/0086674 A1* | 3/2019 | Sinay | G02B 27/283 |
| 2019/0356705 A1 | 11/2019 | Escudero et al. | |
| 2020/0012095 A1 | 1/2020 | Edwin et al. | |
| 2020/0183174 A1* | 6/2020 | Noui | G02B 27/0172 |
| 2020/0368616 A1* | 11/2020 | Delamont | A63F 13/213 |
| 2021/0011284 A1* | 1/2021 | Andreev | G02B 27/0025 |
| 2021/0041948 A1* | 2/2021 | Berkner-Cieslicki | |
| | | | G06F 3/011 |

* cited by examiner

OPTICAL SYSTEMS WITH AUTHENTICATION AND PRIVACY CAPABILITIES

This application claims the benefit of U.S. Provisional Application No. 63/000,650, filed Mar. 27, 2020, which is hereby incorporated by reference herein in its entirety.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance. In addition, devices such as augmented reality headsets can present device authentication and privacy challenges for users.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates image light and an optical system that redirects the light from the display unit towards an eye box. The optical system may be an optical combiner that redirects image light from the display module towards the eye box while also passing real-world light within a field of view to the eye box. The optical combiner may include a waveguide, an input coupler that couples the image light into the waveguide, a first output coupler, and a second output coupler.

The first output coupler may couple a first portion of the image light (e.g., at visible wavelengths) out of the waveguide and towards the eye box. The first output coupler may include holographic optical elements, louvered mirrors, or other structures. The second output coupler may couple a second portion of the image light (e.g., at near-infrared wavelengths) out of the waveguide and towards the surrounding environment. The second output coupler may be formed from one or more filter layers or from a holographic optical element.

The second portion of the image light may include an authentication code that is used by a secondary device to authenticate the head-mounted device. This may allow the secondary device to confirm that an authorized user is using the head-mounted device without requiring all of the user's facial information or other personal information. The second portion of the image light may additionally or alternatively include a pseudorandom pattern or any other desired pattern that serves to prevent camera equipment in the environment from capturing accurate facial recognition information from the user while wearing the head-mounted device.

DETAILED DESCRIPTION

Figure 1:
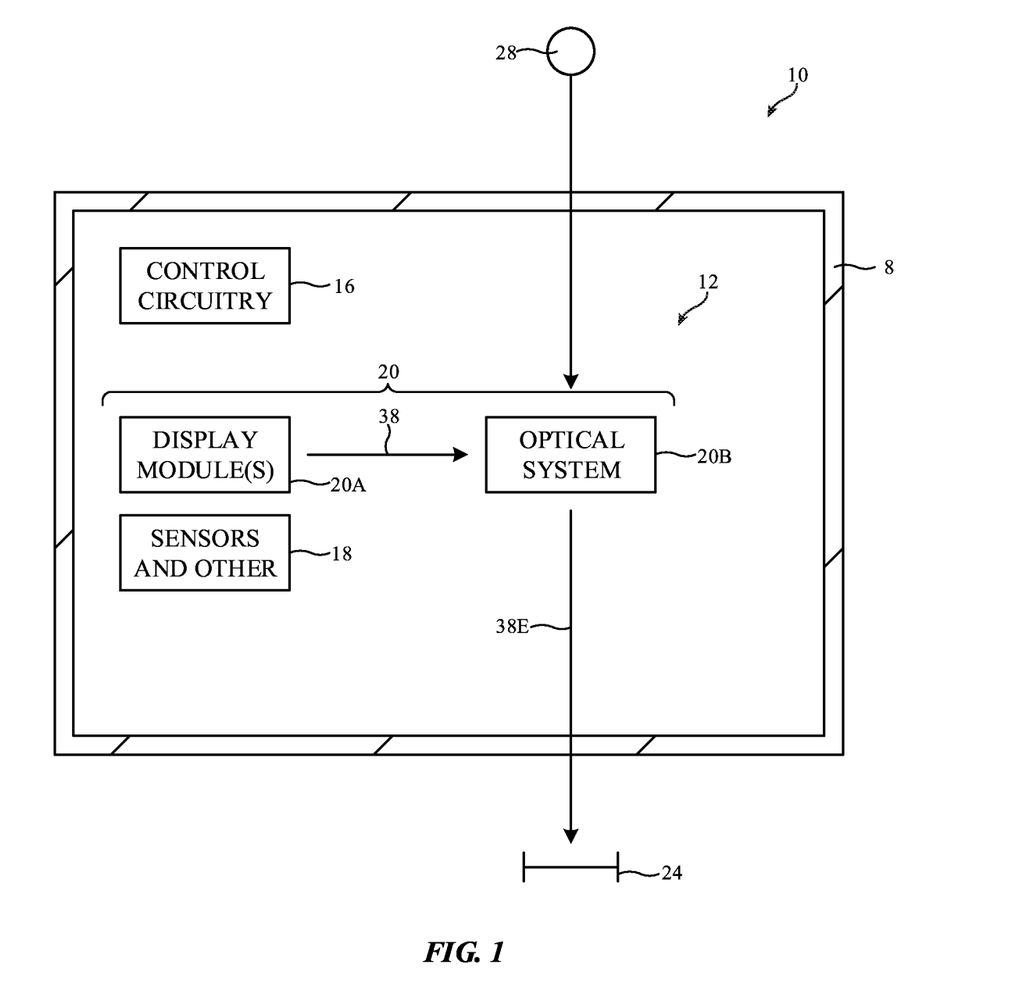
FIG. 1 is a diagram of an illustrative system having a display in accordance with some embodiments.

An illustrative system having a device with one or more near-eye display systems is shown in FIG. 1. System 10 may be a head-mounted display device having one or more displays such as near-eye displays 20 mounted within support structure (housing) 8. Examples in which system 10 is a head-mounted electronic device (sometimes referred to herein as a head-mounted device, head-mounted display device, or head-mounted display) are described herein as an example. System 10 may therefore sometimes be referred to herein as head-mounted device 10. This is merely illustrative and, if desired, system 10 may be any desired type of electronic device or optical system.

Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 (as eye box light 38E) using an associated one of optical systems 20B.

The operation of head-mounted device 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for head-mounted device 10 (e.g., data gathering operations, operations involving the adjustment of components using control signals, image rendering operations to produce image content to be displayed for a user, etc.).

Head-mounted device 10 may include input-output circuitry such as input-output devices 12. Input-output devices 12 may be used to allow data to be received by head-mounted device 10 from external equipment (e.g., a tethered computer, a portable device such as a handheld device or laptop computer, or other electrical equipment sometimes referred to herein as a secondary electronic device) and to allow a user to provide head-mounted device 10 with user input. Input-output devices 12 may also be used to gather information on the environment in which head-mounted device 10 is operating. Output components in devices 12 may allow head-mounted device 10 to provide a user with output and may be used to communicate with external electrical equipment. Input-output devices 12 may include sensors and other components 18 (e.g., image sensors for gathering images of real-world object that are digitally merged with virtual objects on a display in head-mounted device 10, accelerometers, depth sensors, light sensors, haptic output devices, speakers, batteries, wireless communications circuits for communicating between head-mounted device 10 and external electronic equipment, etc.).

Display modules 20A may be liquid crystal displays, organic light-emitting diode displays, laser-based displays, reflective displays, or displays of other types. Optical systems 20B may form lenses that allow a viewer (e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by optical system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in head-mounted device 10 (e.g., in an arrangement where a camera captures real-world images of object 28 and this content is digitally merged with virtual content at optical system 20B).

Head-mounted device 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source or secondary device coupled to system 10) and/or may be generated by control circuitry 16 (e.g., text, other computer-generated content, etc.). The content that is supplied to display 20 by control circuitry 16 may be viewed by a viewer at eye box 24.

Figure 2:
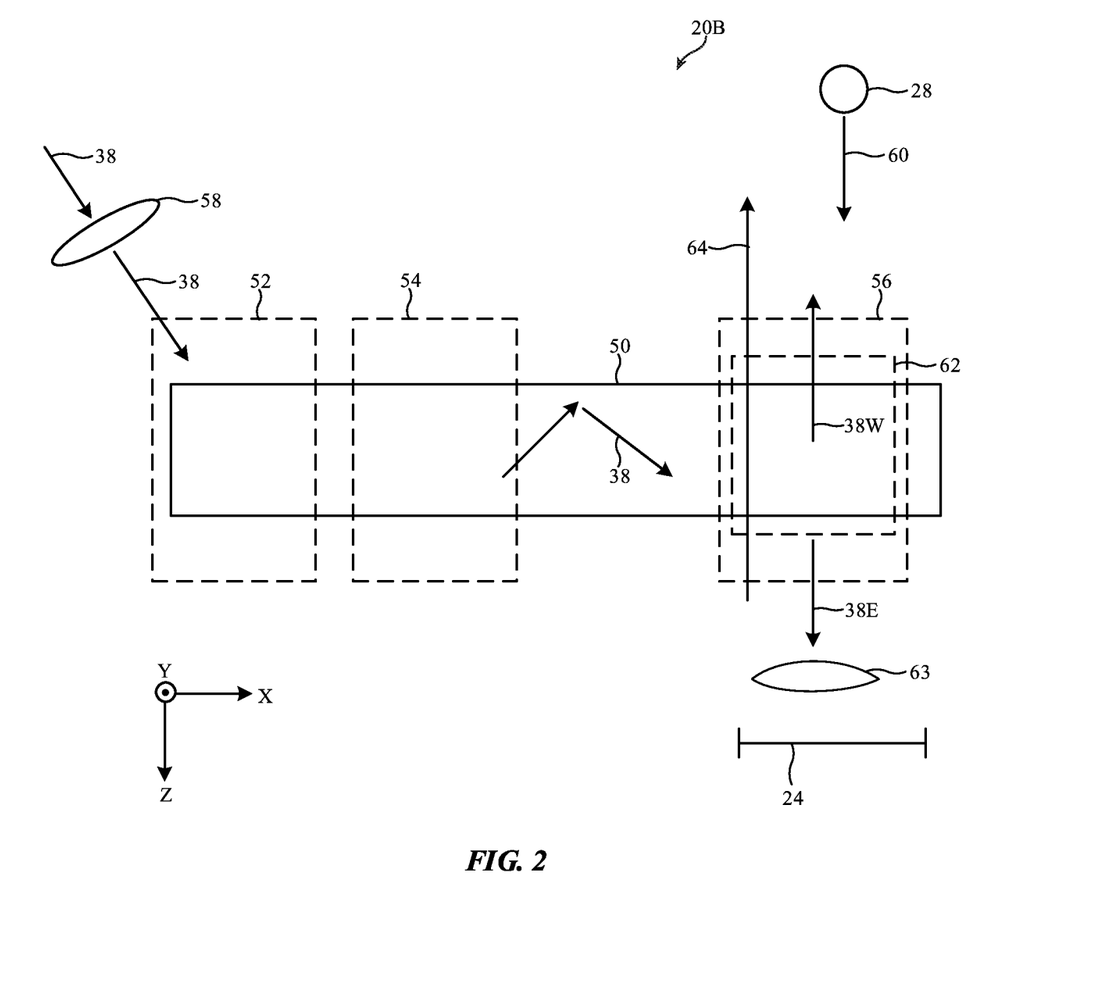
FIG. 2 is a top view of an illustrative optical system for a display that includes a waveguide, an eye box output coupler, and a world output coupler in accordance with some embodiments.

FIG. 2 is a top view of an illustrative optical system 20B that may be used in head-mounted device 10 of FIG. 1. As shown in FIG. 2, optical system 20B may include optical elements such as waveguide 50, input optics 58, output optics 63, input coupler 52, cross coupler 54, and output coupler 56. Input optics 58 may include collimating lenses or other optical components that pass image light 38 to input coupler 52. Image light 38 may be provided to optical system 20B by a display unit in display module 20A (FIG. 1). The display unit (sometimes referred to herein as a display engine) may be a display unit based on a liquid crystal display, organic light-emitting diode display, cathode ray tube, plasma display, projector display (e.g., a projector based on an array of micromirrors), liquid crystal on silicon display, or other suitable type of display. Optical system 20B may be used to present image light 38 output from the display unit to eye box 24.

Waveguide structures such as waveguide 50 in optical system 20B may be formed from one or more stacked layers of polymer, glass, or other transparent substrates capable of guiding light via total internal reflection. Input coupler 52, cross coupler 54, and output coupler 56 may each be partially or completely embedded within waveguide 50 or mounted to a surface of waveguide 50. Some of optical couplers 52, 54, and 56 may be mounted to a surface of waveguide 50 whereas others of couplers 52, 54, and 56 are embedded within waveguide 50. One or more of couplers 52, 54, and 56 may be omitted if desired. Output optics 63 may include lenses that help to focus image light 38 coupled out of waveguide 50 by output coupler 56 onto eye box 24. Input optics 58 and/or output optics 63 may be omitted if desired.

Input coupler 52 may be configured to couple image light 38 from the display module into waveguide 50, whereas output coupler 56 may be configured to couple image light 38 from within waveguide 50 out of waveguide 50 and towards eye box 24 (as eye box light 38E). For example, when image light 38 from input optics 58 strikes input coupler 52, input coupler 52 may redirect image light 38 so that the light propagates within waveguide 50 via total internal reflection towards output coupler 56 (e.g., in the direction of the X axis). When light 38 strikes output coupler 56, output coupler 56 may redirect image light 38 out of waveguide 50 towards eye box 24 (e.g., along the Z axis as eye box light 38E).

In the example of FIG. 2, cross coupler 54 is optically interposed between input coupler 52 and output coupler 56. In this example, input coupler 52 may redirect image light 38 towards cross coupler 54. Cross coupler 54 may expand image light 38 in a first direction and may also couple (redirect) the expanded light back into waveguide 50. Waveguide 50 propagates the light expanded by cross coupler 54 via total internal reflection to output coupler 56. If desired, output coupler 56 may then expand the light received from cross coupler 54 in a second direction that is different from (e.g., perpendicular to) the first direction. Output coupler 56 may, if desired, provide an optical power to the light coupled out of the waveguide. Consider an example in which the image light 38 coupled into waveguide 50 by input coupler 52 includes a pupil of light. Expansion of image light 38 by cross coupler 54 and output coupler 56 may serve to expand the pupil in multiple (e.g., orthogonal) dimensions, thereby allowing a relatively large eye box 24 to be filled with pupils of image light 38 with a sufficient and substantially uniform intensity across the entire area of the eye box.

As shown in FIG. 2, waveguide 50 may also include an additional output coupler such as output coupler 62. Output coupler 62 may, for example, partially or completely overlap output coupler 56 on waveguide 50. Output coupler 56 may couple a first portion of image light 38 out of waveguide 50 and towards eye box 24 as eye box light 38E (e.g., in a direction towards the face/eye of the user while wearing head-mounted device 10). At the same time, output coupler 62 may couple a second portion of image light 38 out of waveguide 50 and towards the exterior world (e.g., a direction opposite to that of eye box light 38E) as world light 38W. World light 38W may be viewable by other people or devices facing head mounted device 10. Output coupler 56 may therefore sometimes be referred to herein as eye box-facing output coupler 56 or eye box output coupler 56, whereas output coupler 62 may sometimes be referred to herein as world-facing output coupler 62 or world output coupler 62.

The first portion of image light 38 coupled out of waveguide 50 as eye box light 38E may be incident upon output couplers 62 and/or 56 at a first range of wavelengths and/or a first range of incident angles whereas the second portion of image light 38 coupled out of waveguide 50 as world light 38W may be incident upon output couplers 62 and/or 56 at a second range of wavelengths different from the first range of wavelengths and/or a second range of incident angles different from the first range of incident angles. Display module 20A (FIG. 1) may provide image light 38 to waveguide 50 with a first set of image content (data) to be displayed at eye box 24 as eye box light 38E (e.g., where the first set of image content is provided by display module 20A at the first range of wavelengths and/or incident angles). Display module 20A may concurrently provide image light 38 to waveguide 50 with a second set of image content (data) to be displayed to the exterior world as world light 38W (e.g., where the second set of image content is provided by display module 20A at the second range of wavelengths and/or incident angles). The same display module may be used to provide the first and second sets of image content or different display modules may be used to provide the first and second sets of image content respectively. Control circuitry 16 (FIG. 1) may control display 20A to provide image light 38 to waveguide 50 in this way.

Input coupler 52, cross coupler 54, eye box output coupler 56, and/or world output coupler 62 may be based on reflective and refractive optics, may be based on filter layers (e.g., dichroic filters, low-pass filters, high-pass filters, etc.), or may be based on holographic (e.g., diffractive) optics. Combinations of these arrangements may be used across the couplers if desired. In arrangements where couplers 52, 54, 56, or 62 are formed from reflective and refractive optics, the couplers may include one or more reflectors (e.g., an array of micromirrors, partial mirrors, louvered mirrors, louvered partial reflectors, or other reflectors). In arrangements where couplers 52, 54, 56, or 62 are based on holographic optics, the couplers may include holographic media such as photopolymers, gelatin such as dichromated gelatin, silver halides, holographic polymer dispersed liquid crystal, or other suitable volume holographic media. Holographic recordings (e.g., holographic phase gratings sometimes referred to herein as holograms) may be stored in the holographic media. The holographic media may sometimes be referred to herein as grating media.

A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of grating medium if desired. The holographic phase gratings may be, for example, volume holograms in the grating medium.

If desired, one or more of couplers 52, 54, 56, and 62 may be implemented using other types of diffraction grating structures such as surface relief grating structures. Surface relief grating structures include diffraction gratings (e.g., surface relief gratings) that are mechanically cut, etched, or otherwise formed in a surface relief grating medium. The surface relief gratings diffract light that is incident upon the surface relief gratings. Rather than modulating index of refraction in the grating medium (as performed to create holographic phase gratings such as volume holograms), surface relief gratings are produced by varying the physical thickness of the medium across its lateral area. Multiple surface relief gratings (e.g., two surface relief gratings) may be multiplexed within the same volume of surface relief grating medium if desired. Meta-gratings may be used in another suitable arrangement.

In one suitable arrangement that is sometimes described herein as an example, input coupler 52 is a non-diffractive input coupler (e.g., an input coupler that does not include diffraction gratings such as surface relief gratings or holographic phase gratings). For example, input coupler 52 may include an input prism (e.g., a transmissive or reflective prism), an angled surface (edge) of waveguide 50, etc. Use of a non-diffractive input coupler such as an input prism may allow image light 38 to be coupled into waveguide 50 without producing the chromatic dispersion that is otherwise associated with input-coupling using diffractive elements. In another suitable arrangement, input coupler 52 may be formed using diffraction gratings such as volume holograms or other grating structures. In these scenarios, any chromatic dispersion introduced by the input coupler may be reversed by the output coupler in diffracting the light out of the waveguide (e.g., in a scenario where the output coupler includes holographic phase gratings such as volume holograms).

Cross coupler 54 may include diffractive grating structures that diffract the image light 38 coupled into waveguide 50 by the (non-diffractive) input coupler 52. The grating structures in cross coupler 54 may include surface relief grating structures (e.g., one or more surface relief gratings) or phase grating structures such as volume holographic grating structures (e.g., a set of at least partially overlapping volume holograms). In another suitable arrangement, cross coupler 54 may include reflective structures such as louvered mirrors.

In the example of FIG. 2, waveguide 50 is an optical combiner that combines real-world light 60 (sometimes referred to herein as environmental light 60 or world light 60) with eye box light 38E from display module 20A (e.g., for an augmented reality display system). In this scenario, eye box output coupler 56 may provide eye box light 38E to eye box 24 for view by the user of head-mounted device 10 while wearing head-mounted device 10. Eye box light 38E may include both at least a portion of the image light 38 that propagates down waveguide 50 via total internal reflection (e.g., the first portion of the image light coupled out of waveguide 50 by eye box output coupler 56) and environmental light 60 from external real-world objects 28 (e.g., eye box light 38E may superimpose digitally-generated image data with light from a real world scene in front of head-mounted device 10).

At the same time, head-mounted device 10 may use world light 38W coupled out of waveguide 50 by world output coupler 62 to convey (e.g., display) information or other data/content to the real world external to the user and head-mounted device 10. This information may be observed by other people in the vicinity of head-mounted device 10 (e.g., people other than the user wearing head-mounted device 10) and/or by other external equipment being used to capture images of head-mounted device 10 and/or the user of head-mounted device 10. In addition, some light such as light 64 may pass from the face and/or eye of the user of device 10 to the exterior world through waveguide 50. This light 64 may, for example, include ambient light or other light that has reflected off of the user's eye and/or face while the user is wearing head-mounted device 10. Light 64 may therefore sometimes be referred to herein as facial light 64. As with world light 38W, facial light 64 may be observed by other people in the vicinity of head-mounted device 10 and/or by other external equipment being used to capture images of head-mounted device 10 and/or the user of head-mounted device 10.

Figure 3:
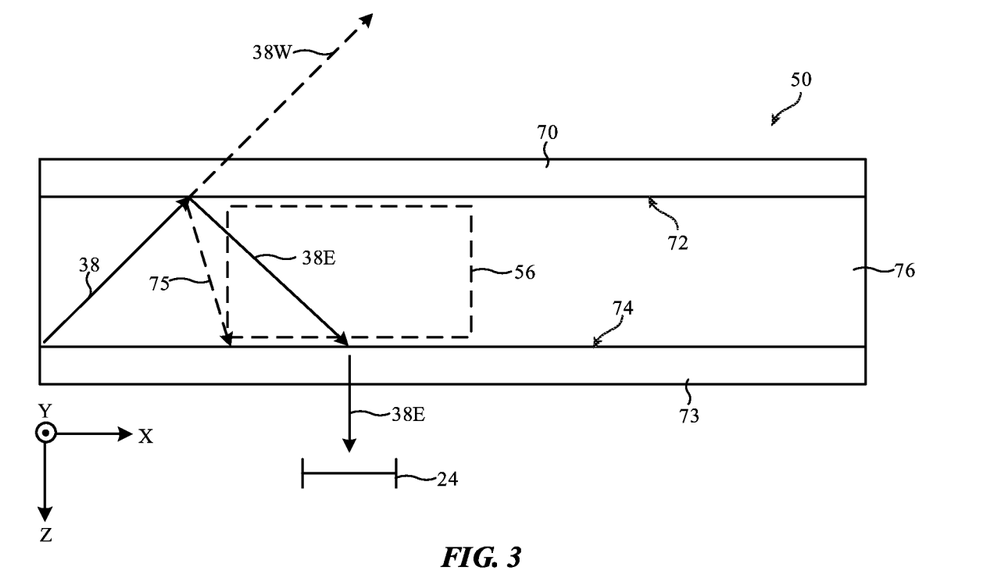
FIG. 3 is a top view of an illustrative waveguide having a world output coupler formed from filter layers in accordance with some embodiments.

FIG. 3 is a top view of waveguide 50 showing how world output coupler 62 of FIG. 2 may be formed using filter layers on waveguide 50. As shown in FIG. 3, waveguide 50 may include a substrate layer 76 (e.g., a layer of grating medium, a glass layer, a plastic layer, etc.). Substrate layer 76 (waveguide 50) may have a first lateral surface 74 and an opposing second lateral surface 72. Lateral surface 74 faces eye box 24 and the user's face while the user wears head-mounted device 10. Lateral surface 72 faces the real world external to the user's face (e.g., faces away from eye box 24 and the user while the user wears head-mounted device 10).

A first filter layer such as filter layer 70 may be layered onto lateral surface 72 of substrate layer 76. A second filter layer such as filter layer 73 may be layered onto lateral surface 74 of waveguide 50 (e.g., filter layers 70 and 73 may form world output coupler 62 of FIG. 2). Filter layers 70 and 73 may completely or at least partially overlap (e.g., in the X-Y plane). Filter layer 70 may block or reflect light of the first range of wavelengths (e.g., light to be directed towards eye box 24 as eye box light 38E) while transmitting light of the second range of wavelengths (e.g., light to be directed towards the external world as world light 38W). Similarly, filter layer 73 may transmit light of the first range of wavelengths (e.g., light to be directed towards eye box 24 as eye box light 38E) while blocking or reflecting light of the second range of wavelengths (e.g., light to be directed towards the external world as world light 38W).

In general, the first and second ranges of wavelengths may include any desired wavelengths. In one suitable arrangement that is sometimes described herein as an example, the first range of wavelengths includes visible wavelengths (e.g., any desired set of wavelengths from about 400 nm to about 700 nm) whereas the second range of wavelengths includes near-infrared (NIR) wavelengths (e.g., any desired set of wavelengths from about 750 nm to about 1400 nm). Display module 20A (FIG. 1) may produce image light 38 that includes first image content at the first range of wavelengths (e.g., visible wavelengths) to be displayed at eye box 24 as eye box light 38E and that includes second image content at the second range of wavelengths (e.g., NIR wavelengths) to be displayed to the external world as world light 38W. Using near-infrared wavelengths for world light 38W may prevent world light 38W from undesirably obscuring the view of environmental light 60 (FIG. 2) to the user at eye box 24, for example.

In this arrangement, filter layer 70 may be a long-pass filter configured to transmit light of the second range of wavelengths (e.g., NIR wavelengths) while blocking light of the first range of wavelengths (e.g., visible wavelengths). Filter layer 73 may be a short-pass filter configured to transmit light of the first range of wavelengths while blocking light of the second range of wavelengths. When image light 38 (e.g., light that includes both the first and second ranges of wavelengths) reaches filter layer 70, filter layer 70 may filter out light of the second range of wavelengths as world light 38W, which is then transmitted to the exterior world. Light at the first range of wavelengths (e.g., eye box light 38E) may reflect off of surface 72 towards eye box output coupler 56. Eye box output coupler 56 couples eye box light 38E out of waveguide 50 and towards eye box 24. Filter layer 73 may transmit eye box light 38E. Any remaining world light 38W that is reflected off of surface 72 may be blocked by filter layer 73 from passing to eye box 24, as shown by arrow 75.

Figure 4:
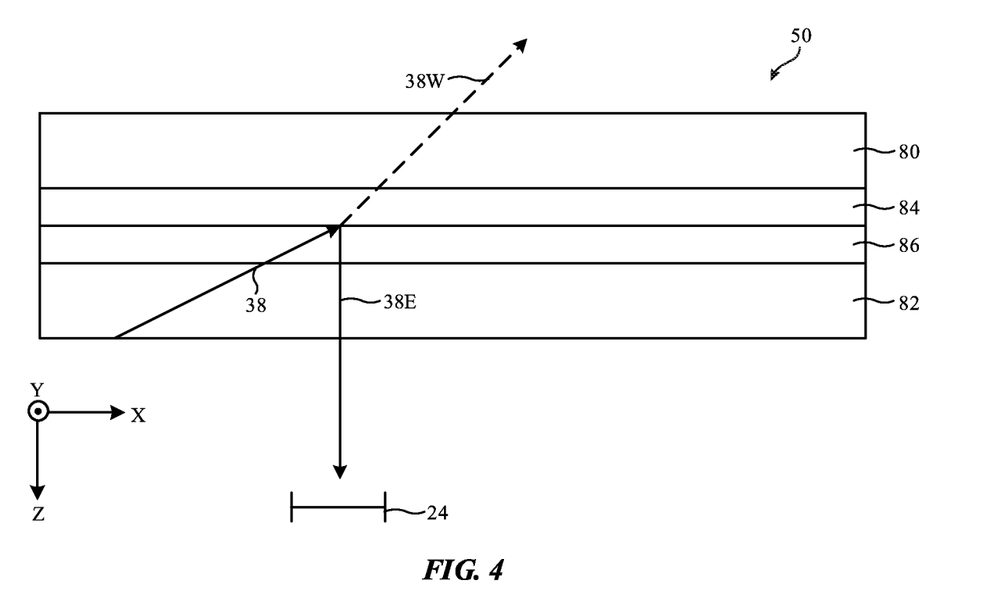
FIG. 4 is a top view of an illustrative waveguide having a world output coupler and an eye box output coupler formed from holographic optical elements in accordance with some embodiments.

The example of FIG. 3 is merely illustrative. Filter layers 70 and 73 may include any desired filter elements (e.g., dichroic filters, filters having pass bands, filters having stop bands, etc.). Filter layer 73 may be omitted if desired. In another suitable arrangement, eye box output coupler 56 and world output coupler 62 of FIG. 2 may be formed using holographic optical elements on waveguide 50. FIG. 4 is a top view of waveguide 50 showing how world output coupler 62 and eye box output coupler 56 of FIG. 2 may be formed using holographic optical elements in waveguide 50.

As shown in FIG. 4, waveguide 50 may include substrate layers 80 and 82 (e.g., glass layers, layers of grating medium, plastic layers, etc.). Substrate layer 82 faces eye box 24 whereas substrate layer 80 faces the exterior world. Waveguide 50 may include a first holographic optical element 86 and a second holographic optical element 84. Holographic optical elements 86 and 84 may completely or at least partially overlap in waveguide 50 (e.g., in the X-Y plane). Holographic optical element 86 may include a first set of diffractive gratings (e.g., holograms such as volume holograms). The first set of diffractive gratings may include multiple multiplexed gratings that diffract different respective subsets of the first range of wavelengths and/or incident angles associated with eye box light 38E. Holographic optical element 84 may include a second set of diffractive gratings (e.g., holograms such as volume holograms). The second set of diffractive gratings may include multiple multiplexed gratings that diffract different respective subsets of the second range of wavelengths and/or incident angles associated with world light 38W. The diffractive gratings in holographic optical element 84 and the diffractive gratings in holographic optical element 86 may be recorded in respective grating medium layers of waveguide 50. In another suitable arrangement, the diffractive gratings in holographic optical element 84 may be recorded (e.g., superimposed) in the same volume of grating medium as the diffractive gratings in holographic optical element 86. One or more additional substrate layers and/or layers of optically clear adhesive may be interposed between holographic optical elements 84 and 86 if desired. Substrate layers 80 and/or 82 may be omitted if desired.

Holographic optical element 84 may form world output coupler 62 whereas holographic optical element 86 forms eye box output coupler 56 of FIG. 2. The diffractive gratings in holographic optical element 86 may be configured to diffract the eye box light 38E in the image light 38 provided by display module 20A out of waveguide 50 and towards eye box 24 (e.g., the diffractive gratings in holographic optical element 86 may be Bragg-matched to the first range of wavelengths and/or incident angles associated with eye box light 38E such that eye box light 38E is diffracted onto output angles that direct eye box light 38E towards eye box 24). The diffractive gratings in holographic optical element 84 may be configured to diffract the world light 38W in the image light 38 provided by display module 20A out of waveguide 50 and towards the exterior world (e.g., the diffractive gratings in holographic optical element 84 may be Bragg-matched to the second range of wavelengths and/or incident angles associated with world light 38W such that world light 38W is diffracted onto output angles that direct world light 38W towards the exterior world). In this example, holographic optical element 84 includes transmissive gratings whereas holographic optical element 86 includes reflective gratings. This is merely illustrative. Holographic optical element 84 may include reflective gratings and/or holographic optical element 86 may include transmissive gratings if desired).

Facial recognition has become a common method for mobile authentication to ensure that a particular user is authorized to operate a particular electronic device. In addition, facial recognition is becoming a more common method of user tracking for personal data agglomeration. For example, retail stores may implement facial recognition technology to identify shoppers and then either use that information to provide targeted shopping experiences or to then sell that information to other entities. Many users would prefer to control with whom they share private data such as their shopping preferences.

Head-mounted device 10 may use world light 38W to display information and/or other signals to the exterior world. If desired, head-mounted device 10 may use world light 38W to display authentication information that is used to authenticate head-mounted device 10 for a corresponding user. If desired, head-mounted device 10 may additionally or alternatively use world light 38W to shield the user from facial recognition technologies.

Figure 5:
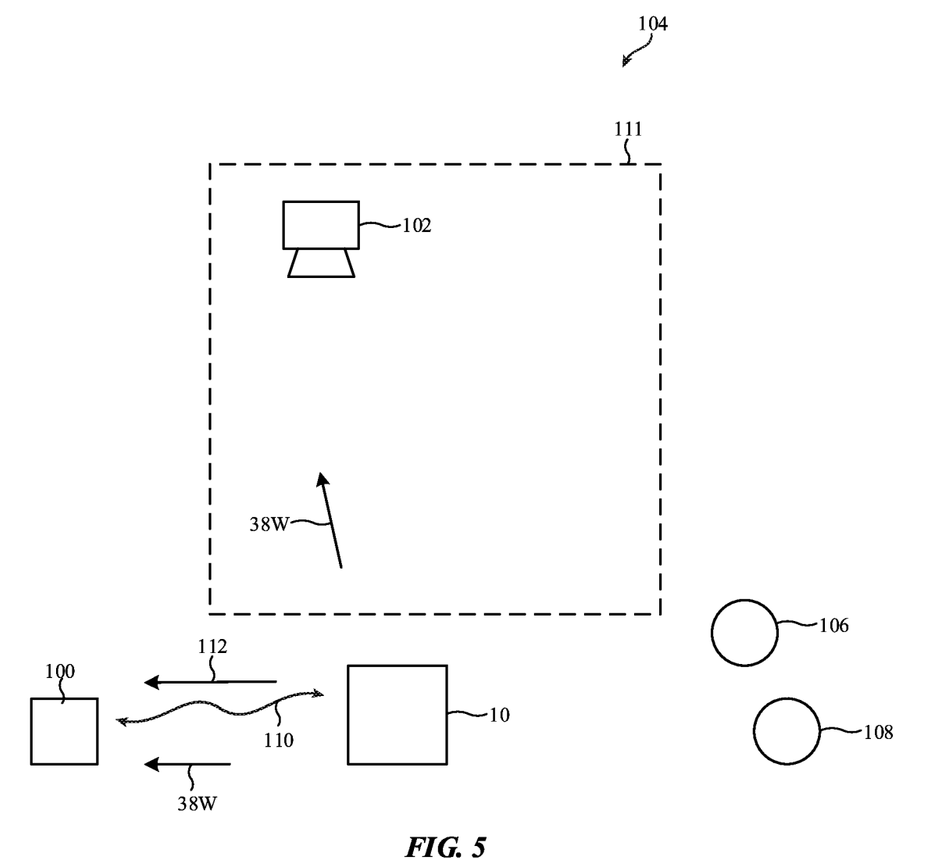
FIG. 5 is a diagram of a system in which a secondary device authenticates a head-mounted device and in which an external camera captures facial recognition information in accordance with some embodiments.

FIG. 5 is a diagram of a system in which head-mounted device 10 may be operated. As shown in FIG. 5, system 104 may include head-mounted device 10 and external equipment such as secondary (electronic) device 100. Secondary device 100 may include control circuitry such as control circuitry 16 of FIG. 1 and sensors and other components such as sensors and other components 18 of FIG. 1. Secondary device 100 may, for example, be a cellular telephone, a tablet computer, a laptop computer, a desktop computer, a display (computer) monitor, a display monitor having an embedded computer therein, a wearable device such as a wristwatch, pendant, or head-mounted device, a gaming controller, a remote control, a home entertainment system, a media console, a portable speaker, a wireless access point or base station, a gaming system, a portable media player, a vehicle, an electronic kiosk, or any other desired electronic equipment.

Secondary device 100 may have wireless communications circuitry and image sensor circuitry. The image sensor circuitry may capture images of visible light as well as light at other wavelengths such as NIR light. The wireless communications circuitry may include a wireless transceiver, baseband processor, and one or more antennas for supporting wireless links such as cellular telephone links, wireless local area network links, wireless personal area network links (e.g., Bluetooth® links), or other links. There may be multiple users within system 104 such as users 106 and 108. User 106 may, for example, be an authorized user of head-mounted device 10 whereas user 108 is not authorized to use head-mounted device 10. When a given user puts head-mounted device 10 on their head, secondary device 100 may perform authentication operations to ensure that that user is authorized to use head-mounted device 10 before certain functions of head-mounted device 10 are enabled.

For example, secondary device 100 may use wireless communication circuitry to provide an authentication code to head-mounted device 10 over wireless link 110 (e.g., a wireless local area network link, a wireless personal area network link, etc.). Display module 20A on head-mounted device 10 (FIG. 1) may produce world light 38W that includes the authentication code. World output coupler 62 (FIG. 2) may display the authentication code in world light 38W to the exterior world. Secondary device 100 may capture image data (e.g., NIR image data) of the authentication code in world light 38W. Secondary device 100 may also capture other facial recognition image data from light 112 reflected off of the user while the user wears head-mounted device 10. Light 112 may include facial light 64 (FIG. 2) and/or, if desired, may include light reflected off of portions of the user's face that are not covered by head-mounted device 10. Secondary device 100 may process the facial recognition image data and the image data captured from the authentication code to verify that the user wearing head-mounted device 10 is authorized to use head-mounted device 10.

If the user is authorized (e.g., if user 106 is wearing head-mounted device 10), secondary device 100 may enable certain features of head-mounted device 10 that are only available to authorized users (e.g., via link 110). For example, secondary device 100 may enable head-mounted device 10 to begin displaying augmented reality content in eye box light 38E, may allow head-mounted device 10 to be powered on, may allow the user to make purchases using head-mounted device 10, may allow the user to access their personal accounts or data using head-mounted device 10, etc. If the user is not authorized (e.g., if user 108 is wearing head-mounted device 10), secondary device 100 may not enable these features or may actively disable features of head-mounted device 10. This may provide additional hardware authentication for head-mounted device 10 and may, for example, be used to replace other facial recognition-based authentication procedures for secondary device 100 so the user does not need to provide their facial information to send and/or receive personalized information using head-mounted device 10.

In some scenarios, a user wearing head-mounted device 10 may enter a surveilled area or region 111. Region 111 may be a region in which camera equipment such as camera 102 is used to gather facial recognition data from persons. Region 111 may be, for example, a retail store, public space, airport, transportation hub, public transport vehicle, educational campus, government facility, etc. Cameras such as camera 102 in region 111 may gather facial recognition data at one or more wavelengths such as NIR wavelengths.

Some users may wish to prevent cameras such as camera 102 from capturing images of their face for facial recognition purposes (e.g., to prevent undesired transmission of their personal data to other parties). Display module 20A on head-mounted device 10 (FIG. 1) may produce world light 38W that includes a two-dimensional pattern of information that serves to obscure camera 102 from capturing accurate images of the user's eyes for use in facial recognition operations. The pattern may be a random or pseudo-random pattern or any other desired pattern of light that interferes with the ability of camera 102 to capture accurate facial recognition data from the user's eyes or face. The wavelength of world light 38W may be selected to overlap with the wavelengths with which camera 102 captures images (e.g., the absorption band of camera 102 such as a band that includes NIR wavelengths). This mode may also be used for authentication purposes if head-mounted device 10 also incorporates a retinal scanning and/or proximity sensor, if desired. Head-mounted device 10 may perform these operations to help shield the user's privacy from facial recognition technologies when the user and head-mounted device 10 are located within region 111. These operations may be disabled or deactivated when head-mounted device 10 is not located within region 111 if desired.

Figure 6:
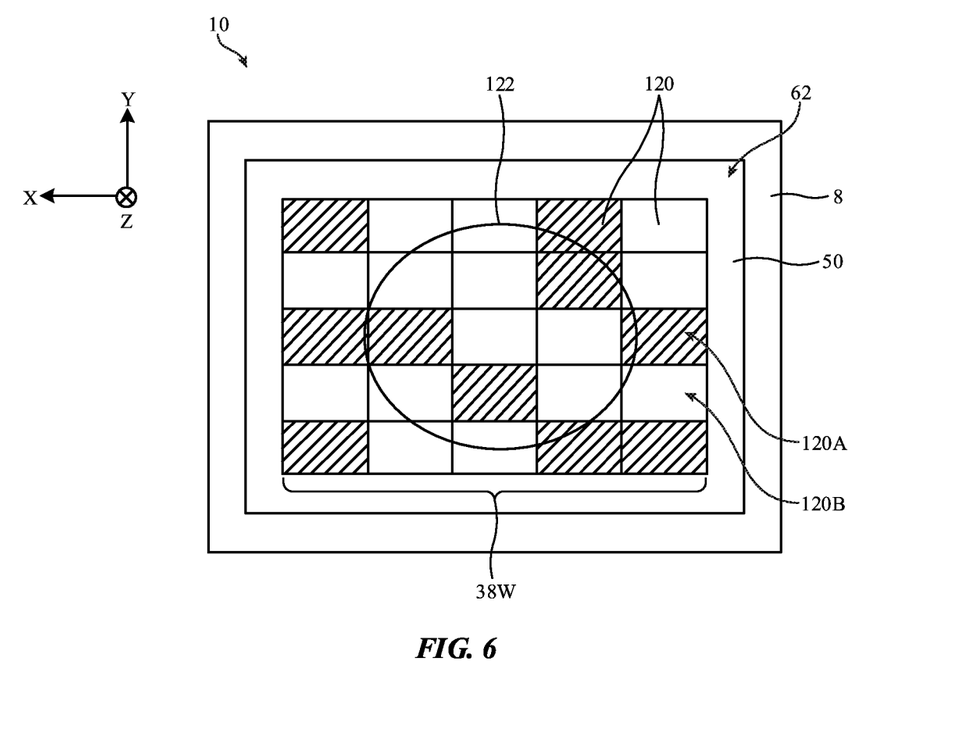
FIG. 6 is a front view of an illustrative waveguide showing how a world output coupler may be used to display authentication data for a secondary device and/or to prevent an external camera from capturing accurate facial recognition information in accordance with some embodiments.

FIG. 6 is a front view showing how world output coupler 62 may display world light 38W for authentication and/or privacy purposes. As shown in FIG. 6, the lateral edges (e.g., rim) of waveguide 50 may be mounted to support structures 8 (e.g., a frame running around the periphery of waveguide 50). The example of FIG. 6 is merely illustrative. Support structures and waveguide 50 may have any desired lateral shape.

The user's eye 122 may overlap waveguide 50 (e.g., at eye box 24 of FIGS. 1-4). World output coupler 62 on waveguide 50 may overlap eye 122. Eye box output coupler 56 (FIG. 2) is not shown in FIG. 6 for the sake of clarity but may direct eye box light 38E (FIG. 2) towards eye 122 (e.g., in the +Z direction). World output coupler 62 may couple world light 38W out of waveguide 50 and towards the exterior world (e.g., in the −Z direction). As shown in FIG. 6, world light 38W may include a two-dimensional pattern (code) of cells (pixels) 120. The pattern may be produced by display module 20A of FIG. 1, for example. In the example of FIG. 6, the two-dimensional pattern of cells 120 is a binary code in which some cells have a logic "1" value (e.g., shaded cells 120A) whereas other cells have a logic "0" value (e.g., unshaded cells 120B). Shaded cells 120A may correspond to regions of world output coupler 62 that are provided with world light 38W by display module 20A whereas unshaded cells 120B may correspond to regions of world output coupler 62 that do not receive world light 38W from display module 20A (e.g., NIR light may be directed towards the exterior world within shaded cells 120A but not within unshaded cells 120B of world light 38W). This example is merely illustrative. If desired, the pattern of cells 120 may be greyscale-encoded (e.g., with more than two possible logical values for each cell 120).

In performing authentication operations, secondary device 100 of FIG. 5 may provide the particular pattern (code) to be displayed using world light 38W. Head-mounted device 10 may then display that pattern to the exterior world using world light 38W and world output coupler 62. An image sensor on secondary device 100 may capture an image (e.g., an NIR image) of the displayed pattern and may process the encoded cells 120 of the displayed pattern to authenticate head-mounted device 10. If desired, the image sensor or another image sensor on secondary device 100 may also capture other image data (e.g., visible light image data) from eye 122 (e.g., through waveguide 50) or from other portions of the user's face that are overlapped by waveguide 50 or that are not overlapped by head-mounted device 10 and may use this image data in conjunction with the image of the displayed pattern to authenticate device 10 (e.g., to ensure that the user having eye 122 is authorized to use that particular head-mounted device 10).

In shielding the user's privacy from facial recognition technology, display module 20A may produce world light 38W that includes a random or pseudorandom pattern of cells 120 to help obscure the details of eye 122 and/or other portions of the user's face overlapping waveguide 50 from being accurately captured by camera 102 of FIG. 5 (e.g., at NIR wavelengths). If desired, world light 38W may be displayed with NIR light filling all cells 120 (e.g., all cells 120 in world light 38W may be shaded cells 120A) to help mask the user's eye from view by camera 102. Because world light 38W is provided at non-visible wavelengths (e.g., NIR wavelengths or other infrared wavelengths), world light 38W remains invisible to eye 122 and to other people who are looking at the user. This may allow head-mounted device 10 to appear to the naked eye as if no additional information is being displayed to the exterior world by waveguide 50, thereby optimizing the aesthetics of head-mounted device 10 and allowing for unobstructed eye contact between the user and other people, even though world output coupler 62 may be concurrently displaying world light 38W that is otherwise visible to secondary device 100 and/or camera 102 (FIG. 5) for authentication or privacy purposes. The example of FIG. 6 is merely illustrative. World light 38W may include a one-dimensional pattern (e.g., a barcode type pattern) or any other desired pattern or coding.

Figure 7:
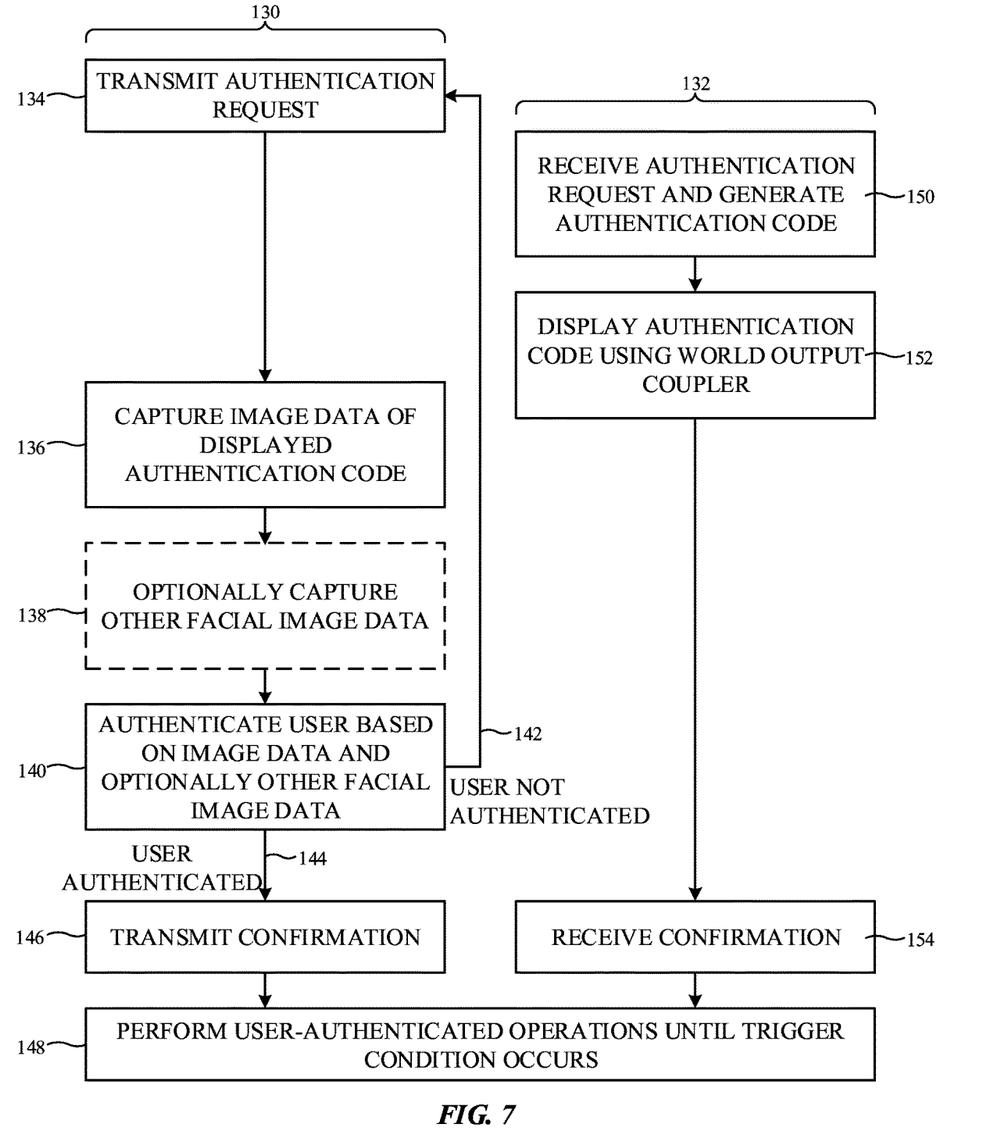
FIG. 7 is a flow chart of illustrative steps that may be performed by a secondary device and a head-mounted device to authenticate the head-mounted device using light displayed by a world output coupler in accordance with some embodiments.

FIG. 7 is a flow chart of illustrative steps that may be performed by head-mounted device 10 and secondary device 100 in authenticating head-mounted device 10 for a corresponding user. Steps 130 of FIG. 7 (e.g., steps 134, 136, 138, 140, 146, and 148) of FIG. 7 may be performed by secondary device 100. Steps 132 of FIG. 7 (e.g., steps 150, 152, 154, and 148) may be performed by head-mounted device 10. The steps of FIG. 7 may be performed after a user has picked up head-mounted device 10, placed head-mounted device 10 over their eyes, attempted to perform actions using head-mounted device 10 that would require user authentication (e.g., attempted to access private information, attempted to make a purchase, attempted to use log in credentials, etc.), or otherwise attempted to use or activate head-mounted device 10, as examples. Secondary device 100 may use sensors to determine when the user has attempted to activate or use head-mounted device 10 in a manner that requires authentication and/or secondary device 100 may receive signals from head-mounted device 10 (e.g., over link 110 of FIG. 5) identifying that the user has attempted to activate or use head-mounted device 10 in a manner that requires authentication.

At step 130, secondary device 100 may transmit an authentication request to head-mounted device 10. Secondary device 100 may transmit the authentication request using radio-frequency signals (e.g., using link 110 of FIG. 5), using optical signals, or using any other desired means. The authentication request may identify an authentication pattern or code to be displayed by head-mounted device 10.

At step 150, head-mounted device 10 may receive the authentication request transmitted by secondary device 100. Display module 20A may generate image light 38 that includes world light 38W and may provide image light 38 to waveguide 50. The world light 38W in image light 38 may include the authentication pattern or code identified by the received authentication request.

At step 152, world output coupler 62 may couple world light 38W out of waveguide 50 and towards the exterior world (e.g., towards secondary device 100). World light 38W may include cells 120 (FIG. 6) that display the authentication pattern or code (e.g., in a two-dimensional array of cells 120 that are displayed in different logical states such as shown by cells 120A and 120B of FIG. 6, thereby encoding the authentication pattern or code).

At step 136, secondary device 100 may use one or more image sensors to capture image data from the authentication code displayed in world light 38W from head-mounted device 10 (e.g., as coupled out of waveguide 50 by world output coupler 62). The image data may include NIR or IR image data (e.g., in scenarios where world light 38W is displayed by head-mounted device 10 at NIR or IR wavelengths).

At optional step 138, secondary device 100 may capture other facial image data from the user of head-mounted device 10. The facial image data may be captured at visible, NIR, IR, and/or other wavelengths. The facial image data may be captured in response to light received by secondary device 100 through waveguide 50 (e.g., light reflected off of the user's eyes or other portions of the user's face overlapping head-mounted device 10 such as facial light 64 of FIG. 2) and/or light received by secondary device 100 from portions of the user's face that are not overlapped by head-mounted device 10.

At step 140, control circuitry on secondary device 100 may process the image data captured from the authentication code displayed in world light 38W and optionally the other facial image data (e.g., as captured at step 138) to authenticate the user of head-mounted device 10. For example, secondary device 100 may authenticate the user if the image data captured from the authentication code displayed in world light 38W includes the authentication pattern or code identified by the authentication request transmitted at step 134 (e.g., secondary device 100 may then have confidence that the head-mounted device 10 that displayed the pattern is the expected head-mounted device 10 subject to the authentication request) and/or if the other facial image data matches expected or predetermined facial image data associated with an authorized user of that head-mounted device 10. This is merely illustrative and, in general, any desired authentication algorithm may be used to authenticate the user for that particular head-mounted device 10 using the displayed pattern and optionally the other facial image data.

If secondary device 100 is unable to authenticate the user for head-mounted device 10 (e.g., if the other facial recognition image data does not match an authorized user, if the other facial recognition image data does not match head-mounted device 10, and/or if the head-mounted device does not display the correct authentication code as identified by the authentication request, etc.), processing may loop back to step 134 as shown by path 142. Other operations may also be performed in response to a failure in authentication, such as powering down head-mounted device 10, blocking access to features of head-mounted device 10 until authentication can be performed, etc.

If secondary device 100 successfully authenticates the user to head-mounted device 10, processing may proceed to step 146 as shown by path 144. At step 146, secondary device 100 may transmit an authentication confirmation to head-mounted device 10.

At step 154, head-mounted device 10 may receive the authentication confirmation from secondary device 100. The authentication confirmation may confirm to head-mounted device 10 that the user wearing head-mounted device 10 is an authorized user.

At step 148, head-mounted device 10 and/or secondary device 100 may perform user-authenticated operations. The user-authenticated operations may include any desired operations that require authentication of the user of head-mounted device 10. Such operations may include, for example, allowing head-mounted device 10 to power on, beginning to display eye box light 38E to the user, allowing the user to access personal or private data using head-mounted device 10, allowing the user to make purchases using head-mounted device 10, allowing the user to use their log in credentials using head-mounted device 10, enabling certain applications or operations on head-mounted device 10, etc. The user-authenticated operations may continue until a trigger condition occurs. The trigger condition may include, for example, the user removing head-mounted device 10 from their head, head-mounted device 10 being powered off, the passage of a predetermined amount of time, entry of head-mounted device 10 into a particular geographic area or region, or any other desired trigger condition for which authentication may need to be performed again.

The steps of FIG. 7 are merely illustrative. Two or more of the steps of FIG. 7 may be performed at least partially concurrently. The steps of FIG. 7 may be performed in other orders. Head-mounted device 10 may display eye box light 38E (FIGS. 2-4) to eye box 24 (e.g., to provide augmented reality content to the user) concurrently with one, more than one, or all of the steps of FIG. 7 (e.g., head-mounted device 10 may continue to perform augmented reality operations even while displaying world light 38W).

Figure 8:
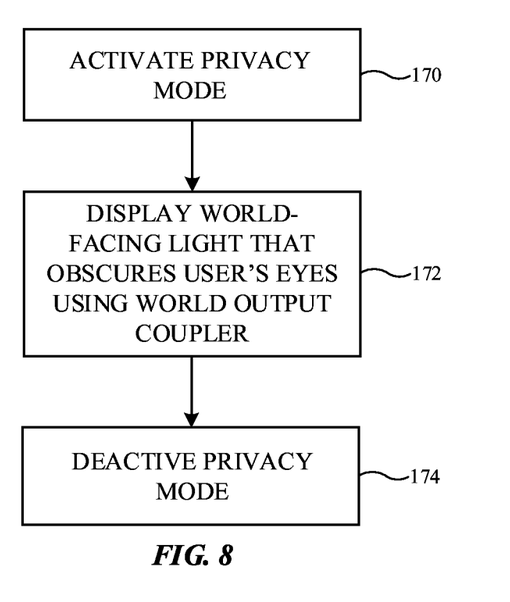
FIG. 8 is a flow chart of illustrative steps that may be performed by a head-mounted device to prevent an external camera from capturing accurate facial recognition information in accordance with some embodiments.

FIG. 8 is a flow chart of illustrative steps that may be performed by head-mounted device 10 in preventing external cameras from gathering accurate facial recognition information from the user of head-mounted device 10.

At step 170, head-mounted device 10 may activate a privacy mode. Head-mounted device 10 may activate the privacy mode in response to an input provided by the user of head-mounted device 10 (e.g., using an input/output device of head-mounted device 10, via an input/output device of secondary device 100, etc.) or may activate the privacy mode autonomously (e.g., in response to detecting the presence of camera 102 of FIG. 6, in response to detecting that head-mounted device 10 has entered region 111, in response to the operation or call of one or more applications running on head-mounted device 10 and/or secondary device 100, etc.). Prior to activating the privacy mode, head-mounted device 10 may not display world light 38W (e.g., all cells 120 of FIG. 6 may be unshaded cells 120B) or may be displaying world light 38W for purposes other than protecting the privacy of the user from facial recognition technologies (e.g., to authenticate device 10 as shown in FIG. 7).

At step 172, head-mounted device 10 may display world light 38W to obscure the user's eyes from facial recognition data-gathering external equipment such as camera 102 of FIG. 5. For example, world output coupler 62 may display world light 38W in all cells of the world light (e.g., all cells 120 of FIG. 6 may be shaded cells 120A) or may display world light 38W in a random, pseudorandom, or other pattern. This may serve to prevent camera 102 from capturing accurate facial recognition image data of the user's eyes while wearing head-mounted device 10 (e.g., at the wavelengths of world light 38W such as NIR wavelengths). By preventing camera 102 from capturing accurate facial recognition image data, head-mounted device 10 may also prevent camera 102 from tracking the user's personal information (e.g., the user's shopping preferences, etc.), because camera 102 will be unable to associate the user with a particular user profile.

At step 174, head-mounted device 10 may deactivate the privacy mode. Head-mounted device 10 may deactivate the privacy mode in response to an input provided by the user of head-mounted device 10 (e.g., using an input/output device of head-mounted device 10, via an input/output device of secondary device 100, etc.) or may deactivate the privacy mode autonomously (e.g., in response to detecting that head-mounted device 10 has left region 111 of FIG. 6, in response to the operation or call of one or more applications running on head-mounted device 10 and/or secondary device 100, etc.). After deactivating the privacy mode, head-mounted device 10 may not display world light 38W (e.g., all cells 120 of FIG. 6 may be unshaded cells 120B) or may be displaying world light 38W for purposes other than protecting the privacy of the user from facial recognition technologies. Head-mounted device 10 may display eye box light 38E (FIGS. 2-4) to eye box 24 (e.g., to provide augmented reality content to the user) concurrently with one, more than one, or all of the steps of FIG. 8 (e.g., head-mounted device 10 may continue to perform augmented reality operations even while displaying world light 38W).

As described above, one aspect of the present technology is the gathering and use of data available from various sources to improve the delivery of images to users, to authenticate particular users and devices, to shield user privacy, to perform facial recognition operations, and/or to perform other display-related operations. The present disclosure contemplates that in some instances, this gathered data may include personal information data that uniquely identifies or can be used to contact or locate a specific person. Such personal information data can include facial recognition data, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate a user before enabling certain device operations, to update displayed images, and/or to perform other desired display operations. Accordingly, use of such personal information data enables users to view updated display images and to access secure content and functionality that are only accessible to authenticated users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user authentication, the present technology can be configured to allow users to select to "opt in" or "opt out" of participation in the collection of personal information data during registration for services or anytime thereafter (e.g., the user may still use other means of authenticating themselves for a particular head-mounted device, such as by entering a password, providing a fingerprint, or using other credentials). In another example, users can select not to perform facial recognition based authentication or other operations that gather personal information data. In yet another example, users can select to limit the length of time facial recognition and authentication is performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, head-mounted device 10 may display images or perform authentication based on non-personal information data or a bare minimum amount of personal information, such as the content being requested by the device associated with a user, other non-personal information available to the display system, or publicly available information.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the YR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment n which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

The foregoing is merely illustrative and various modifications can be made to the described embodiments. The foregoing embodiments may be implemented individually or in any combination.

What is claimed is:

1. An electronic device comprising:
   a projector configured to emit first light;
   a waveguide having a first surface, a second surface opposite the first surface, and an input coupler configured to couple the first light into the waveguide, wherein the waveguide is configured to transmit, from the second surface and through the first surface, second light from an external object;
   a first output coupler on the waveguide and configured to couple a first portion of the first light out of the waveguide through the first surface; and
   a second output coupler on the waveguide, wherein the second output coupler is configured to couple a second portion of the first light out of the waveguide through the second surface and the second portion of the first light includes an authentication code for the electronic device.

2. The electronic device of claim 1, wherein the first portion of the first light comprises light at visible wavelengths and wherein the second portion of the first light comprises light at near-infrared wavelengths.

3. The electronic device of claim 2, wherein the second output coupler comprises:
   a filter layer, wherein the filter layer is configured to transmit light at the near-infrared wavelengths and is configured to block light at the visible wavelengths.

4. The electronic device of claim 3, wherein the first output coupler comprises a set of volume holograms that are Bragg-matched to the visible wavelengths.

5. The electronic device of claim 3, wherein the second output coupler further comprises:
   an additional filter layer, wherein the additional filter is configured to block light at the near-infrared wavelengths and is configured to transmit light at the visible wavelengths.

6. The electronic device of claim 2, wherein the first output coupler comprises a first set of volume holograms that are Bragg-matched to the visible wavelengths and wherein the second output coupler comprises a second set of volume holograms that are Bragg-matched to the near-infrared wavelengths.

7. The electronic device of claim 1, wherein the authentication code comprises a two-dimensional authentication code.

8. The electronic device of claim 7, wherein the two-dimensional authentication code comprises a plurality of cells, wherein the plurality of cells comprises a first set of cells in which the second portion of the first light is coupled out of the waveguide through the second surface, and wherein the plurality of cells comprises a second set of cells in which none of the first light is coupled out of the waveguide through the second surface.

9. The electronic device of claim 1, further comprising:
   one or more processors configured to activate a privacy mode of the electronic device, wherein the projector is configured to, responsive to activation of the privacy mode, produce the second portion of the first light in a pattern that configures the second portion of the first light to obscure capture of images of the waveguide by camera equipment in an environment around the electronic device.

10. The electronic device of claim 1, wherein the second portion of the first light includes a two-dimensional pseudorandom pattern of cells.

11. An electronic device comprising:
    a waveguide having a first surface and a second surface opposite the first surface, wherein the waveguide is configured to propagate a first portion of light and a second portion of the light via total internal reflection;
    an input coupler configured to couple the first and second portions of the light into the waveguide;
    a first output coupler configured to couple the first portion of the light out of the waveguide through the first surface; and
    a second output coupler configured to couple the second portion of the light out of the waveguide through the second surface, wherein the first portion of the light comprises an image and the second portion of the light comprises a two-dimensional pattern of cells.

12. The electronic device of claim 11, wherein the two-dimensional pattern of cells comprises a two-dimensional pseudorandom pattern of cells.

13. The electronic device of claim 11, wherein the two-dimensional pattern of cells is configured to obscure capture of images of the waveguide by camera equipment in an environment around the electronic device.

14. The electronic device of claim 11, wherein the first portion of the light comprises visible wavelengths and wherein the second portion of the light comprises near-infrared wavelengths.

15. The electronic device of claim 11, wherein the first output coupler comprises a diffractive grating or a louvered mirror.

16. An electronic device comprising:
- a waveguide having a first surface and a second surface opposite the first surface, wherein the waveguide is configured to propagate a first portion of light and a second portion of the light via total internal reflection;
- an input coupler configured to couple the first and second portions of the light into the waveguide;
- a first holographic optical element on the waveguide and configured to couple the first portion of the light out of the waveguide through the first surface; and
- a second holographic optical element on the waveguide and at least partially overlapping the first holographic optical element, wherein the second holographic optical element is configured to couple the second portion of the light out of the waveguide through the second surface and the second portion of the light is configured to obscure capture of images of the waveguide by camera equipment in an environment around the electronic device.

17. The electronic device of claim 16, wherein the first portion of the light comprises a first range of wavelengths and wherein the second portion of the light comprises a second range of wavelengths.

18. The electronic device of claim 17, wherein the first range of wavelengths comprise a wavelength between 400 nm and 700 nm and wherein the second range of wavelengths comprise a wavelength between 750 nm and 1400 nm.

* * * * *